United States Patent [19]

Small

[11] 4,452,713

[45] Jun. 5, 1984

[54] INHIBITION OF THE STAINING OF PORCELAIN SURFACES BY MANGANESE

[75] Inventor: Leonard E. Small, Cincinnati, Ohio

[73] Assignee: The Procter & Gamble Company, Cincinnati, Ohio

[21] Appl. No.: 438,202

[22] Filed: Nov. 1, 1982

[51] Int. Cl.$^3$ .................. C11D 3/395; C11D 7/54
[52] U.S. Cl. .................. 252/99; 252/135; 252/174.23; 252/181; 252/DIG. 2; 252/DIG. 16; 210/697; 210/756; 4/227; 4/228
[58] Field of Search .............. 252/99, 135, DIG. 2, 252/DIG. 16, 174.23, 181; 210/697; 4/227, 228

[56] References Cited

U.S. PATENT DOCUMENTS

| | | |
|---|---|---|
| 2,964,467 | 12/1960 | Lambert et al. .............. 210/697 |
| 3,168,554 | 2/1965 | Phillips et al. .............. 260/502 |
| 3,303,104 | 2/1967 | Rubin .............. 252/99 |
| 3,442,937 | 5/1969 | Sennewald et al. .............. 260/502 |
| 3,978,235 | 8/1976 | Schiro .............. 426/335 |
| 4,115,293 | 9/1978 | Schoenholz et al. .............. 252/102 |
| 4,129,423 | 12/1978 | Rubin .............. 51/304 |
| 4,176,059 | 11/1979 | Suzuki .............. 210/697 |
| 4,269,723 | 5/1981 | Barford et al. .............. 252/106 |
| 4,283,300 | 8/1981 | Kurtz .............. 252/95 |

FOREIGN PATENT DOCUMENTS

| | | |
|---|---|---|
| 401938 | 1/1942 | Canada . |
| 2034200 | 12/1970 | France . |
| 132269 | 10/1975 | Japan . |
| 425001 | 2/1935 | United Kingdom . |
| 2089830 | 6/1982 | United Kingdom . |

OTHER PUBLICATIONS

Condensed Chemical Dictionary, 7th Ed. (p. 865) (Reinhold, NY 1966).
FMC Glassy Phosphates, T. B. FMC Co. (prior to 1980).
Journal AWWA, pp. 662-663 (Dec. 1977).
Phosphorus Chemistry in Everyday Living, pp. 128-129 (Toy), American Chemical Society, Washington, D.C. 1976.

Primary Examiner—John E. Kittle
Assistant Examiner—Hoa Van Le
Attorney, Agent, or Firm—Richard C. Witte; Ronald L. Hemingway

[57] ABSTRACT

Method, composition and article of manufacture to inhibit the staining of water-contacting surfaces, such as those in a toilet bowl, which is caused by manganese present in household water in the presence of an oxidizing material. Manganese staining is inhibited by supplying to the water 0.05 ppm to 10 ppm of a glassy phosphate having the formula $MO(MPO_3)_nM$ wherein M is sodium or potassium and n is an integer of from about 6 to about 21.

12 Claims, No Drawings

INHIBITION OF THE STAINING OF PORCELAIN SURFACES BY MANGANESE

TECHNICAL FIELD

The technical field to which this subject matter is most pertinent is that of dispensing materials to a toilet tank in order to clean and disinfect a flushing toilet. The invention also has broader application to other situations in which water supplies containing manganese are brought into contact repeatedly with the porcelain surfaces of water storage and receiving elements.

INTRODUCTION

The problem to which the teachings of the present invention are directed is that of the staining of the surfaces of porcelain water-receiving articles, such as toilet bowls, by an oxidized form of manganese which may be produced when manganese-containing water supplies are brought into contact with oxidizing materials in the presence of the porcelain articles.

The magnitude of this problem is indicated by reference to a study produced by the United States Environmental Protection Agency, wherein water samples were taken in communities throughout the country and analyzed for manganese content. This study is summarized in the publication entitled *Chemical Analysis of Interstate Carrier Water Supply Systems*, available from the U.S. Environmental Protection Agency (publication number EPA 430/9-75-005). That study indicates that about 8% of the population of the United States uses water from supplies which contain at least 50 parts per billion (ppb) of manganese. This manganese ordinarily remains in the water in the form of soluble salts of divalent manganese (divalent manganese is hereinafter referred to as "Mn(II)." (More generally, a Roman numeral associated with an ionic species shall be used herein to denote the ion's valence.) But in the presence of the oxidizing ion, hypochlorite ($OCl^-$), this Mn(II) can be oxidized to the tetravalent manganese ion, Mn(IV), forming an insoluble material (typically manganese dioxide, $MnO_2$) which can severely discolor a toilet bowl or other porcelain surface. Noticeable staining is observed at manganese levels of roughly 50 ppb if 5 ppm (parts per million) of hypochlorite are also present in the water. The severity of staining increases as the manganese and hypochlorite concentrations increase. The concentration of manganese found in water supplies in high manganese areas of the United States is on the order of 250 ppb.

Other inventors have produced improvements in automatic toilet tank dispensers which, among other things, may automatically ration sanitizing ingredients to a toilet tank as it is flushed in order to maintain clean and sanitary conditions in the toilet tank and bowl. Solutions which deliver available chlorine in the form of hypochlorites have been found to be particularly useful to sanitize the toilet bowl. However, since hypochlorites are strong oxidizing materials (a property which contributes greatly to their utility as sanitizing agents), these hypochlorite solutions when introduced into the toilet bowl are able to oxidize the solubilized Mn(II) ions to form insoluble Mn(IV) oxides. Under certain conditions, particularly those illustrated in connection with the present invention, these insoluble manganese (IV) salts can deposit on, and adhere to, porcelain surfaces on the bowl to form dark brown manganese stains.

The chemistry of the manganese staining reaction is important to a complete understanding of the present invention, and accordingly, what follows is the theory which appears to underlie the present invention. It will be understood, however, that the validity of the invention does not depend on the accuracy of the theory. Three factors appear to contribute to the peculiar nature of manganese staining.

First, the reaction kinetics of the oxidation of Mn(II) to Mn(IV) are an important factor in manganese staining. The oxidation of manganese occurs at a sufficiently slow rate that substantial quantities of aqueous manganese ion can reach the porcelain surfaces of the toilet bowl and be absorbed thereon before oxidation to the insoluble Mn(IV) oxide occurs. As a result, the manganese achieves its position on the toilet bowl surfaces while soluble, and then oxidizes to a form which is difficult to remove. On the other hand, the manganese oxidation reaction is sufficiently rapid to allow it to go forward at an appreciable rate to cause a stain in the first instance.

The second factor which appears to make staining due to manganese a special problem is the autocatalytic nature of the manganese oxidation reaction. That is, the manganese oxidation reaction is catalyzed by the presence of Mn(IV) compounds, particularly manganese dioxide. This means that, although it may take a long time for a noticeable stain to appear, the eventual oxidation of only a very small portion of the available manganese will catalyze the reaction, which then proceeds rapidly to completion to produce a heavily stained surface.

Third, once the manganese stain is formed, it is extremely tenacious and difficult to remove with ordinary cleaning materials. The chemical nature of this problem is that certain tetravalent manganese compounds, particularly manganese dioxide, are insoluble in water and are stable with respect to oxidizing materials which are found in conventional cleaning compositions. Also, the colored manganese compounds which form the stain are adsorbed into the porcelain surfaces of the toilet bowl. The stain is thus resistant to removal using scouring cleansers, for the abrasive particles of cleansers which are suitable for use on porcelain surfaces do not sufficiently abrade the toilet bowl to remove the adsorbed stains.

The factors—autocatalysis, kinetics, and tenacity—which make the manganese stain a special problem are not necessarily applicable to stains caused by the oxidation of other metallic species. For example, consider the staining which may occur due to the oxidation of iron from a soluble Fe(II) salt to Fe(III) oxide. This stain, while objectionable, is not particularly tenacious and may be removed using scouring cleansers. The kinetics of this oxidation reaction are such that the oxidation is very rapid in a solution which contains 5 ppm of available chlorine, as taught herein to be useful for sanitizing purposes. This reaction, as opposed to the manganese oxidation, is fast enough that nearly all of the Fe(II) in solution is oxidized, and precipitates or forms a suspension, before it has time to be tightly adsorbed into the porcelain surfaces of the toilet bowl. Thus, the Fe(III) forms a sedimentary deposit or a suspension which is largely removed by flushing, and which may be more completely removed by brushing or scrubbing the remaining stain. Finally, the Fe(III) stain is not autocatalyzed, so the rate of staining does not escalate after a stain first appears.

BACKGROUND ART

The prior art contains a number of references in various contexts which relate to the present invention.

U.S. Pat. No. 4,283,300, Kurtz, issued Aug. 11, 1981, discloses the hypochlorite-manganese staining problem in the context of toilet bowl treatment and teaches the use of an organic chelating agent, partially hydrolyzed polyacrylamide, to inhibit stain formation.

Commonly assigned U.S. patent application Ser. No. 234,535, Callicott, filed Feb. 17, 1981, teaches the use of an organic chelating agent, ethylene-maleic anhydride polymer, to inhibit stain formation caused by oxidation of Mn(II) to Mn(IV).

U.S. Pat. No. 4,115,293, Schoenholtz, issued Sept. 19, 1978, teaches the use of a variety of chelating agents, such as aminocarboxylates and polyphosphates (including metaphosphate) to inhibit the manganese staining of dentures when said denatures are soaked in an aqueous solution of potassium monopersulfate oxidizing agent.

SUMMARY OF THE INVENTION

A first aspect of the present invention is the provision of a tableted glassy phosphate composition which may be inserted into a toilet tank dispenser which automatically provides the indicated concentrations of glassy phosphate to the toilet bowl. These compositions comprise from about 1% to about 30% by weight of glassy phosphate having the formula $MO(MPO_3)_nM$ wherein M is sodium or potassium and n is from about 6 to about 21. These compositions are preferably compounded in the form of a cake which can also contain 60% to 90% of a solid water-soluble organic matrix material such as a surfactant or water-soluble polymer or resin, as well as other ingredients (such as dyes, perfumes, etc.) which do not participate either in the creation or the removal of manganese stains (All percentages and proportions herein are "by weight" unless otherwise indicated).

A second aspect of the present invention is a method for inhibiting the staining of surfaces in contact with water which contains manganese (II) ion and an oxidizing material capable of oxidizing Mn(II) to Mn(IV), comprising the step of establishing in the water a concentration of from 0.05 to 10 parts per million (ppm), preferably from 0.1 to 5 ppm, and most preferably from 0.1 to 1 ppm of a glassy phosphate.

A third aspect of the invention is a dispensing article for use in the tank of a flush toilet which comprises a tank and a bowl, the said dispensing article comprising independent first and second dispensing means which contain, respectively, a composition comprising a source of hypochlorite ion and a composition comprising glassy phosphate, wherein said respective dispensing means, upon flushing of the toilet, dispense into the flush water a sufficient quantity of their respective compositions to establish a hypochlorite concentration of about 3 to 20 ppm available chlorine and a glassy phosphate concentration of 0.05 to 10 ppm in the toilet bowl water at the end of the flush.

DESCRIPTION OF THE PREFERRED EMBODIMENTS

The following description of embodiments of the present invention is provided in order to illustrate the practice of the invention, and should not be construed as restricting the scope of the invention.

Since the present invention finds primary utility in the cleaning and disinfecting of toilets, it will be described primarily in the context of that utility, although it will be understood that the invention is applicable to other situations where aqueous oxidizing solutions come into contact with surfaces which can be stained by oxidized manganese.

The present method invention is carried out by supplying 0.05 ppm to 10 ppm, preferably 0.1 ppm to 5 ppm, and most preferably about 0.1 ppm to about 1 ppm of glassy phosphate to the Mn(II)-containing water which comes into contact with porcelain surfaces (e.g., a toilet bowl).

The glassy phosphates suitable for use herein are well-known polymeric phosphates having the general formula $MO(MPO_3)_nM$ wherein n is a number of from about 6 to about 21, and M is sodium or potassium. Such materials are commercially available, e.g., under the names SODAPHOS$^R$ (n=6), HEXAPHOS$^R$ (n=13), and Glass H$^R$ (n=21), all from FMC Corporation.

The amount of Mn(II) ion in the water to be treated in accordance with the invention herein will be at least 50 ppb and may be as high as 250 ppb. Below the level of about 50 ppb, Mn(II), manganese staining caused by hypochlorite oxidation of Mn(II) is not a significant problem. Generally, the water will also contain calcium and magnesium water hardness at concentrations of from about 85 ppm to about 350 ppm, as $CaCO_3$.

The amount of hypochlorite calculated as available chlorine, present in the water in accordance with the invention, will normally be in the range of from about 3 ppm to about 20 ppm, preferably from about 3 ppm to about 10 ppm. At these levels, the hypochlorite provides significant antibacterial and cleaning effects, as a consequence of its strong oxidizing power.

The following theory is proposed to explain the manganese stain inhibiting action of the glassy phosphates described above, although this theory is not intended to limit the scope of the present invention. The glassy phosphates are water-soluble oligomers with multiple phosphate moieties. These moieties give the glassy phosphates the properties of a chelating agent, allowing them to sequester metal ions such as manganese. The three essential results of this chelating action are: first, Mn(II) and (IV) are kept away from porcelain surfaces while these species are in the bowl (because the chelating agents combine with these ionic species to form soluble materials, suspensions, or loose precipitates); second, the chelating agents maintain these ionic species in a form, such as a solution or a flushable precipitate, that is washed away once the toilet is flushed; and third, the Mn(II) ions are sequestered in a way that inhibits their oxidation to Mn(IV).

One feature that has been found to distinguish the manganese stain inhibiting materials of the present invention from other materials is the ability of the present materials to prevent manganese staining in the presence of a great excess of calcium and magnesium hardness ions as are found in hard water. This phenomenon is not predicted by the present materials' estimated binding constants for magnesium or calcium. Thus, even though typical hard water has many times more hardness ions than the highest known manganese concentration in a water supply (e.g., 100 ppm vs. 350 ppb), the phosphate materials taught herein for stain inhibition have been found to be suprisingly effective to inhibit manganese staining without being required in sufficient quantities to chelate the hardness ions and the manganese ions which are present in the water. While this phenomenon is not fully understood, the reason is seen to be that the glassy phosphates exert an effect on manganese due to operation of some mechanism in addition to ordinary chelation.

To practice the present invention, any of the above glassy phosphate materials, either singly or in combinations, are dispensed into the water of a toilet tank or bowl so that after flushing, the toilet bowl contains the indicated concentrations of glassy phosphate. One way to accomplish this is to place liquid solutions of the glassy phosphate in a liquid dispenser of the type which dispenses a constant volume of a liquid to the flush tank of a toilet which comprises a flush tank and a bowl, every time the toilet is flushed. Water from the tank then is supplied to the toilet bowl in the typical fashion, so that the water introduced into the toilet bowl has the required amount of glassy phosphate. A preferred dispenser may deliver a dose of 1-2 milliliters of solution to a toilet tank every time it is flushed, so that in order to deliver the desired amount of glassy phosphate to the toilet bowl and tank, a solution containing about 0.05% to 10% by weight of the glassy phosphate is placed in the dispenser and dispensed into a toilet with a dilution factor of approximately 10,000 times. It will be apparent to those skilled in the art that many different toilet dilution factors and stain inhibiting solution concentrations can be used to practice the present invention, provided the final concentration of the material supplied to prevent manganese staining in the toilet bowl water is within the indicated ranges. Of course, concentrations of glassy phosphate above 10 ppm can be used, but such higher levels are not necessary to obtain manganese stain inhibition and are thus wasteful.

In a particularly preferred embodiment of the present invention, the stain inhibiting composition is adapted to the dispensed from passive dosing dispensers such as those as described in U.S. Pat. No. 4,126,027, Wages, issued Aug. 5, 1980, and U.S. Pat. No. 4,208,747, Dirksing, issued June 24, 1980. These patents are hereby incorporated herein by reference. Such dispensers are particularly preferred because they may contain a cake or cakes of solid ingredients which are exposed to water to form a cleaning, disinfecting, or aesthetic solution which is kept in isolation from the water of the toilet tank during the period between flushes, at which time a measured quantity of the solution is provided to the toilet flush water. Providing such measured quantity with each flush produces a fairly constant level of the desired ingredients within the water of the toilet bowl at all times. Other types of dispensing units which contain a cake of solid composition which is not isolated from the toilet tank water can also be used. See for example U.S. Pat. No. 3,504,384, Radley et al., issued Apr. 7, 1970, incorporated by reference herein.

Also, a solid cake composition containing the glassy phosphates herein can be suspended above the water line on the wall of the toilet bowl in a manner whereby water entering the bowl during the flush cascades over the cake, thereby dissolving a portion of it into water which remains in the bowl at the end of the flush.

Because of the high efficiency of the glassy phosphates as manganese stain inhibitors, particular solid cake compositions of cleaning ingredients may be formulated for use in a toilet tank dispenser which will produce the toilet bowl concentrations of glassy phosphate required by the present invention without the need to fabricate cakes of unduly large size and without the need to incorporate an undue excess of glassy phosphate in the cake of active ingredients. The cake preferably comprises the glassy phosphate in a matrix of water-soluble organic material which has appropriate solubility characteristics so as to provide a solution of the desired concentration of glassy phosphate when the cake is contacted with water. For example, a cake of glassy phosphate and a solid-water-soluble organic material may be formulated with from about 60% to about 90% of a surfactant or water-soluble polymer or resin and from about 1% to about 30% of glassy phosphate. Other ingredients which may be included in the composition of the solid cake within the scope of the present invention are as follows: 0% to 6% of a suitable dye; 0% to 20% of a perfume with a desirable fragrance; and 0% to 40% of suitable bleach catalysts (e.g., sodium bromide), diluent materials (e.g., sodium sulfate), or processing aids (e.g., a talc surface coating).

In a preferred practice of the invention in the context of automatic toilet bowl cleaning, a hypochlorite solution is supplied to the toilet water from a dispensing means separate from that which dispenses the ingredients of the above-described cake. This is done to prevent prolonged contact between high concentrations of the oxidizing agent and the other ingredients prior to their dispensation to the toilet. The invention is not limited to situations in which the hypochlorite and glassy phosphate are separately dispensed to the toilet, however, nor is it limited to an embodiment in which the hypochlorite is intentionally supplied to the toilet. It is within the contemplation of the invention that the hypochlorite be dispensed in combination with other ingredients, or it may even be present in the water as supplied to the toilet from a public or private water supply, for example, water which has been chlorinated.

What follows is a description of each of several of the ingredients which can be present in the glassy phosphate-containing cakes made according to preferred embodiments of the present invention.

ORGANIC MATRIX MATERIAL

The organic matrix material of the glassy phosphate-containing cake can be any water-soluble organic material. The organic material will be chosen so as to have appropriate solubility characteristics so as to provide the desired degree of solubility and solubility rate for the cake and also to have the appropriate degree of plasticity so the cake can be formed into the desired shape and maintain its structural integrity when subjected to handling and contact with water.

Preferred organic matrix materials are surfactants and water-soluble polymers and resins.

The surfactants can be selected from the anionic, nonionic and zwitterionic types. An extensive disclosure of suitable surfactants is found at Columns 7-10 of U.S. Pat. No. 4,302,350, Callicott, issued Nov. 24, 1981, and incorporated by reference herein.

Surfactants which have a high degree of stability to hypochlorite are especially preferred. Examples of such surfactants are the alkyl sulfates and paraffin sulfonates. Alkyl sulfates are the water-soluble salts of sulfated fatty alcohols containing from about 8 to about 18 carbon atoms in the alkyl group. Examples of suitable alcohols which can be employed in alkyl sulfate manufacture include decyl, lauryl, myristyl, palmityl and stearyl alcohols and the mixtures of fatty alcohols derived by reducing the glycerides of tallow and coconut oil.

Specific examples of alkyl sulfate salts which can be employed in the instant surfactant/dye compositions include sodium lauryl alkyl sulfate, sodium stearyl alkyl sulfate, sodium palmityl alkyl sulfate, sodium decyl alkyl sulfate, sodium myristyl alkyl sulfate, potassium lauryl alkyl sulfate, potassium stearyl alkyl sulfate, potassium palmityl alkyl sulfate, potassium myristyl alkyl sulfate, sodium dodecyl sulfate, potassium dodecyl sulfate, potassium tallow alkyl sulfate, sodium tallow alkyl sulfate, sodium coconut alkyl sulfate, potassium coconut alkyl sulfate and mixtures of these surfactants. Highly preferred alkyl sulfates are sodium coconut alkyl sulfate, potassium coconut alkyl sulfate, potassium lauryl alkyl sulfate and sodium lauryl alkyl sulfate.

Paraffin sulfonate surfactants have the general formula $RSO_3M$, wherein R is a primary or secondary alkyl group containing from about 8 to about 22 carbon atoms (preferably 10 to 18 carbon atoms) and M is an alkali metal, e.g., sodium or potassium. Paraffin sulfonate surfactants and methods for their preparation are well known in the art. They may be prepared, for example, by reaction of hydrocarbons with sulfur dioxide, oxygen and a sulfonation reaction initiator. Alternatively, they may be prepared by reacting an alkene and a sodium bisulfite under suitable radiation or catalysis, as disclosed in British Pat. No. 1,451,228 published Sept. 29, 1976, and hereby incorporated herein by reference. Paraffin sulfonate surfactants are commercially available, e.g., from Farbwerke Hoechst A. G.

Preferred paraffin sulfonates herein are secondary paraffin sulfonates. Examples of specific paraffin sulfonates herein are:

Sodium-1-decane sulfonate;
Potassium-2-decane sulfonate;
Lithium-1-dodecane sulfonate;
Sodium-6-tridecane sulfonate;
Sodium-2-tetradecane sulfonate;
Sodium-1-hexadecane sulfonate;
Sodium-4-octadecane sulfonate;
Sodium-3-octadecane sulfonate.

Normally, the paraffin sulfonates are available as mixtures of individual chain lengths and position isomers, and such mixtures are suitable for use herein.

Surfactant mixtures are useful herein. A particularly preferred mixture comprises coconut alkyl sulfate and $C_{11-13}$ straight chain alkyl benezene sulfonate in a weight ratio of 1:1.

Water-soluble organic polymers and resins which may be used, either alone or in combination with surfactants in the cake compositions include polyethylene glycols of molecular weight 1,000 to 8,000, poly(ethylene oxide) resins of molecular weight 100,000 to 7,000,000, polyvinyl alcohols, and polyvinylpyrrolidones.

STAIN INHIBITING AGENT

The glassy phosphate stain inhibiting agents for use herein have been described above, so no need is seen for a repetition of this description.

DYES

While it is appreciated that no dye is essential to the operation of the present invention, it is desirable to incorporate a dye in the cake in order to color the water of the toilet, both to indicate the presence or absence of the ingredients of the cake in the toilet bowl and to improve the appearance of the bowl water. Either of two types of dyes may be incorporated into compositions of the present invention in order to provide these effects.

A first type of dye which may be used herein is a dye which is relatively stable to hypochlorite solutions, so that its color persists despite the presence in the toilet bowl of a concentration of hypochlorite which is effective to maintain sanitary conditions. Such dyes are described in a commonly owned U.S. Pat. No. 4,200,606, Kitko, issued Apr. 29, 1980, which is hereby incorporated herein by reference.

A second type of dye which may be incorporated in the cake is one which initially dyes the toilet bowl water, but which is bleached to a colorless state responsive to the presence of a sanitizing concentration of hypochlorite. Such a system allows the consumer to evaluate whether a dispenser which is intended to dispense hypochlorite and the cake ingredients from separate sources is in fact dispensing both ingredients. In this dye system a color which initially appears is indicative of the dispensing of the cake ingredients, since the dye is part of the cake. The gradual disappearance of this color indicates that hypochlorite is being dispensed to the bowl at a concentration which is effective to bleach the dye. Such a dye system is described in a commonly owned U.S. Pat. No. 4,248,827, Kitko, issued Feb. 3, 1981, which is hereby incorporated herein by reference.

PERFUMES

Perfumes are a desirable component of the compositions herein. The perfumes selected for use in the compositions of the present invention should be stable to hypochlorite in the environment of preferred use, and should be sufficiently potent that the indicated percentage by weight of perfume will supply to the water of the toilet an aesthetically desirable concentration of perfume in the head space immediately adjacent the water of the toilet tank and bowl. Generally, the level of perfume used in the compositions herein will be from about 5% to about 20% of the composition.

DILUENT PROCESSING AIDS AND OTHER MATERIALS

Various materials may be incorporated in the cake of the present invention in order to dilute the dry ingredients to a consistency which may be easily worked in conventional blending equipment. Examples of such materials are sodium chloride, sodium sulfate, fatty alcohols, and other materials well known to persons skilled in the art of making tablets or cakes of detergent materials. Desired materials of this type are inexpensive and water-soluble, and are stable with respect to all of the components of the surfactant cake. Talc can be coated on the surface of the cake to facilitate handling.

Another particularly desirable material to add to the composition is sodium bromide. This material serves as a catalyst to improve the rate at which a hypochlorite solution separately dispensed to a toilet bowl will decolorize the bleachable dye system described above, under low pH conditions.

CAKE MANUFACTURE

The manufacture of solid cakes from the compositions of the present invention is well within the capability of persons of ordinary skill in the art of forming cakes of detergent materials. The cakes of the present invention as described herein can be manufactured by mixing the raw materials into a homogeneous mass and noodling, plodding, extruding, cutting and stamping the mass to form uniform bars or cakes of desired size, for example, cakes which are sized to fit within the preferred dispensers such as those described in U.S. Pat. Nos. 4,126,027 and 4,208,747, incorporated by reference above.

DISINFECTING SOLUTIONS

As is mentioned above, the presence of strong oxidizing materials in the toilet bowl is one of the causes of the manganese staining which is reduced or eliminated by the present invention. Absent the problem of manganese staining, the addition of hypochlorite ions to toilet water is highly desirable because hypochlorite is an efficacious sanitizing agent. Hypochlorite ions may be supplied to the toilet bowl by any of a wide variety of compounds. Specific examples of compounds of this type include sodium hypochlorite, potassium hypochlorite, lithium hypochlorite, calcium hypochlorite, calcium hypochlorite dihydrate, monobasic calcium hypochlorite, dibasic magnesium hypochlorite, chlorinated trisodium phosphate dodecahydrate, potassium dichloroisocyanurate, sodium dichloroisocyanurate, trichloroisocyanuric acid, sodium dichloroisocyanurate dihydrate, 1,3-dichloro-5,5-dimethylhydantoin, N-chlorosulfamide, chloroamine T, dichloroamine T, chloroamine B, and dichloroamine B. Preferred sanitizing agents are calcium hypochlorite, lithium hypochlorite, and mixtures thereof. A preferred sanitizing agent suitable for use in the practice of the present invention is described in the commonly assigned U.S. patent entitled PASSIVE DOSING DISPENSER WITH IMPROVED HYPOCHLORITE CAKE, U.S. Pat. No. 4,281,421, Nyquist et al., issued Aug. 4, 1981, said patent being incorporated herein by reference. As indicated in the Nyquist patent, the sanitizing material is compounded into a separate cake which is dispensed to the toilet water from an entirely separate dispenser than the cake containing the other ingredients such as dye, perfume, surfactant, etc., which are to be dispensed into the toilet water. The separate dispensers for the two respective cakes are desirably molded into a single integral unit, as by thermoforming shells and assembling them as indicated in the Nyquist patent. Means are thus provided to dispense hypochlorite to the water of a toilet while concurrently dispensing the indicated proportions of a manganese stain inhibiting agent in order to inhibit the staining which is caused by the oxidizing effect of hypochlorite on Mn(II) ions in the water supply.

The present invention will be illustrated by the following example.

EXAMPLE

This experiment illustrates the manganese stain-inhibiting effect of the glassy phosphates in toilets treated with hypochlorite sanitizing agent.

The following surfactant cakes containing different levels of the glassy phosphate, Glass H, which has the formula $NaO(NaPO_3)_{21}Na$ were prepared:

TABLE 1

| Component | A (%) | B (%) | C (%) | D (%) | E (%) | F (%) |
| --- | --- | --- | --- | --- | --- | --- |
| Na Coco alkyl sulfate | 30.7 | 30.7 | 30.7 | 30.7 | 30.7 | 30.7 |
| Na Linear alkylbenzene sulfonate | 30.7 | 30.7 | 30.7 | 30.7 | 30.7 | 30.7 |
| NaCl | 25.9 | 23.9 | 20.9 | 17.9 | 15.9 | 22.9 |
| Dye | 1.9 | 1.9 | 1.9 | 1.9 | 1.9 | 1.9 |
| Perfume | 11.0 | 11.0 | 11.0 | 11.0 | 11.0 | 11.0 |
| Glass H | 0 | 2.0 | 5.0 | 8.0 | 10.0 | 3.0 |

Bleach cakes of the following formula were also prepared:

TABLE 2

| Component | % Composition |
| --- | --- |
| Calcium Hypochlorite* (65% AvCl_2) | 60 |
| Lithium Hypochlorite** (35% AvCl_2) | 15 |
| NaCl | 18 |
| Sodium Metasilicate | 7 |

*HTH - Olin Corp.
**Lithium Corp. of America

Each of the respective surfactant cakes and a bleach cake were sealed, respectively, into separate dispensers of a dual dispensing apparatus which was thermoformed from 0.022 inch thick polyvinyl chloride, and which is suitable for automatic, simultaneous dispensing of bleach solution and surfactant solution into a flushing toilet at each flush. Each of the dispensers in the dual dispensing apparatus was of a configuration generally similar to that described in FIG. 17 of U.S. Pat. No. 4,208,747, Dirksing, issued June 24, 1980. These separate dispensers of the dual dispensing apparatus produce concentrated solutions, respectively, of the bleach composition and the surfactant composition in water which enters the dispensers when the toilet tank is filling after a flush. The respective dispensers serve to substantially isolate the concentrated solutions from each other and from the tank water during the period between flushes. The measuring cavity and inlet conduit of the bleach-containing portion of the dual dispensing apparatus is so sized that approximately 20 cubic centimeters of bleach-containing solution is dispensed with each flush cycle of the toilet.

The surfactant cake-containing portion of the dual dispensing apparatus is so sized that approximately 5 cubic centimeters of surfactant-containing solution is dispensed into the flush water as it leaves the tank during each flush cycle of the toilet.

American Standard Cadet toilets comprising a flush tank and a bowl were equipped with the aforedescribed dual unit dispensers by mounting the dispenser in the tank with a mounting device of the type described in U.S. Pat. No. 4,247,070, Dirksing, issued Jan. 27, 1981, incorporated by reference herein.

Manganese (II) ion was provided to the toilets by injecting approximately 1 ml of a solution of $MnCl_2$ containing 4700 ppm Mn(II) from an automatic dispenser into the toilet tank water on the down flush each time the toilet was flushed. This provided from about 90 to about 200 parts per billion of Mn(II) in the toilet bowl water after each flush.

The bleach concentration in the toilet bowl after each flush was from about 3 ppm to about 10 ppm $AvCl_2$.

The Glass H concentrations produced in the toilet bowl for each of the surfactant cake compositions were approximately as follows: A, 0 ppm; B, 0.13 ppm; C, 0.33 ppm; D, 0.52 ppm; E, 0.65 ppm; and F, 0.20 ppm.

For Compositions A–E, the toilets were flushed at 30 minute intervals with 24°–27° C. water. The same procedure was followed with Compositions A and F, except that the toilets were flushed every 30 minutes with 16° C. water. The toilet bowls were visually examined periodically for presence of stain. Results are shown in the following tables.

TABLE 3

Stain Results, 75°-80° F. Water Temperature

| Product | Stain Description | | |
|---|---|---|---|
| | 43 Flushes | 124 Flushes | 222 Flushes |
| A | Brown stain[1] | Brown stain[2] | Reddish-brown stain[3] |
| B | No stain | Brown stain[4] | Brown stain[5] |
| C | No stain | No stain | No stain |
| D | No stain | No stain | No stain |
| E | No stain | No stain | No stain |

A - Control
B - 2% Glass H (~0.13 ppm)
C - 5% Glass H (~0.33 ppm)
D - 8% Glass H (~0.52 ppm)
E - 10% Glass H (~0.65 ppm)
[1]Moderate medium brown stain overall below waterline.
[2]Heavy dark brown stain overall below waterline, some stain above waterline.
[3]Very dark reddish-brown stain overall below waterline, stain above also.
[4]Very light brown stain at waterline.
[5]Very light brown stain at and below waterline.

TABLE 4

Stain Results, 60° F. Water Temperature

| Product | Stain Description | | |
|---|---|---|---|
| | 90 Flushes | 145 Flushes | 271 Flushes |
| A | Reddish-brown stain[1] | Reddish-brown stain[2] | Reddish-brown stain[3] |
| F | No stain | No stain | No stain |

A - Control
B - 3% Glass H (~0.20 ppm)
[1]Light-moderate reddish-brown stain below waterline; brown streaks above waterline.
[2]Dark reddish-brown stain below waterline; brown streaks above waterline.
[3]Very dark reddish-brown stain below waterline; dark brown streaks above waterline.

What is claimed is:

1. A dispensing article for use in the tank of a toilet which comprises a tank and a bowl, said article comprising independent first and second dispensing means which contain, respectively, a composition comprising a source of hypochlorite ion and a composition comprising glassy phosphate, wherein said respective dispensing means, upon flushing of the toilet, dispense into the flush water a sufficient quantity of their respective compositions to establish a hypochlorite concentration of about 3 ppm to about 20 ppm available chlorine and a glassy phosphate concentration of about 0.05 ppm to 10 ppm in the toilet bowl water at the end of the flush, and wherein said glassy phosphate has the formula $MO(MPO_3)_nM$ wherein M is sodium or potassium and n is a number of from about 6 to about 21.

2. The article of claim 1 wherein said hypochlorite concentration is from about 3 ppm to about 10 ppm and wherein said glassy phosphate concentration is from about 0.1 ppm to about 5 ppm.

3. The article of claim 2 wherein said dispensing means completely isolate said source of hypochlorite ion and said glassy phosphate from the tank water during the period between flushes.

4. The article of claims 1, 2, or 3 wherein the glassy phosphate composition comprises from about 1% to about 30% glassy phosphate and from about 60% to about 90% of a solid, water-soluble matrix material.

5. The article of claim 4 wherein the solid matrix material is selected from the group consisting of surfactants and water-soluble organic polymers and resins.

6. The article of claim 5 wherein the organic matrix is an anionic surfactant.

7. A method for inhibiting the staining of surfaces in contact with water which contains at least 50 ppb manganese (II) ion and an amount of hypochlorite ion sufficient to oxidize said Mn(II) to Mn(IV), comprising the step of establishing in the water a concentration of from 0.05 to 10 parts per million (ppm), of a glassy phospate having the formula $MO(MPO_3)_nM$ wherein M is sodium or potassium and n is a number of from about 6 to about 21 and wherein said water has a hardness of from about 85 ppm to about 350 ppm, calculated as calcium carbonate.

8. The method of claim 7 wherein the hypochlorite concentration is from about 3 ppm to about 20 ppm available chlorine.

9. The method of claim 8 wherein said method is employed in a flush toilet.

10. The method of claim 9 wherein said glassy phosphate and said hypochlorite are dispensed separately into the flush water of the toilet during the flush.

11. The method of claim 10 wherein said glassy phosphate and said hypochlorite are dispensed into the tank of a toilet which comprises a flush tank and a bowl.

12. The method of claim 11 wherein, at the end of the flush, the concentration of said hypochlorite is from about 3 ppm to about 10 ppm and the concentration of said glassy phosphate is from about 0.1 ppm to about 5 ppm.

* * * * *